United States Patent [19]

Schneider et al.

[11] Patent Number: 4,906,602

[45] Date of Patent: Mar. 6, 1990

[54] CATALYST FOR THE SELECTIVE HYDROGENATION OF POLYUNSATURATED HYDROCARBONS AND PROCESS FOR PREPARING THE CATALYST

[75] Inventors: Michael Schneider, Ottobrunn/Riemerling; Karl Kochloefl, Bruckmuhl/Heufeld; Jürgen Ladebeck, Bad Aibling; Gerd Maletz, Bruckmuhl, all of Fed. Rep. of Germany

[73] Assignee: Sud-Chemie Aktiengesellschaft, Munich, Fed. Rep. of Germany

[21] Appl. No.: 261,674

[22] Filed: Oct. 24, 1988

[30] Foreign Application Priority Data

Oct. 28, 1987 [DE] Fed. Rep. of Germany ....... 3736557

[51] Int. Cl.⁴ .................... B01J 21/06; B01J 23/44; B01J 23/48; B01J 23/72
[52] U.S. Cl. .................... 502/304; 502/330; 502/331; 585/261
[58] Field of Search ................ 502/330, 331, 304; 585/261

[56] References Cited

U.S. PATENT DOCUMENTS

| | | |
|---|---|---|
| 3,224,981 | 12/1965 | Stephens et al. ............... 252/460 |
| 3,472,763 | 10/1969 | Cosyns et al. ................. 208/255 |
| 3,775,342 | 11/1973 | Kronig et al. .................. 252/430 |
| 3,822,308 | 7/1974 | Kronig et al. .................. 260/497 |
| 3,857,894 | 12/1974 | Morelli et al. .................. 260/666 |
| 3,947,510 | 3/1976 | Morelli et al. .................. 260/677 |
| 4,404,124 | 9/1983 | Johnson et al. ................ 252/466 |
| 4,409,410 | 10/1983 | Cosyns et al. ................. 585/259 |
| 4,484,015 | 11/1984 | Johnson et al. ................ 585/262 |
| 4,490,481 | 12/1984 | Boitiaux et al. ................ 502/330 |
| 4,517,395 | 5/1985 | Obenaus et al. ............... 585/259 |
| 4,547,600 | 10/1985 | Cosyns et al. ................. 585/259 |
| 4,613,714 | 9/1986 | Stadler et al. .................. 585/271 |

FOREIGN PATENT DOCUMENTS

| | | |
|---|---|---|
| 1283737 | 8/1969 | United Kingdom . |
| 1301145 | 2/1970 | United Kingdom . |
| 1534136 | 12/1975 | United Kingdom . |

OTHER PUBLICATIONS

Chemical Abstracts, vol. 100, p. 34122q.
Chemical Abstracts, vol. 93, p. 222964b.
Chemical Abstracts, vol. 87, p. 133910q.
Chemical Abstracts, vol. 81, p. 127349y.
Chemical Abstracts, vol. 100, p. 7365q.

*Primary Examiner*—W. J. Shine
*Attorney, Agent, or Firm*—Herbert P. Price

[57] ABSTRACT

A catalyst for the selective hydrogenation of polyunsaturated hydrocarbons which contain entirely or predominantly more than five carbon atoms, containing palladium with a promotor on a metal oxide support. The promotor is a metal from the subgroup IB of the periodic system (preferably silver) and the metal oxide support ($TiO_2$ optionally mixed with $CeO_2$ and/or $ZrO_2$) is macroporous, the pore volume being about 0.2 to 0.4, preferably about 0.25 to 0.30 ml per g of carrier and the proportion of the macropores having a diameter of more than 14 nm being at least 65%.

22 Claims, No Drawings

CATALYST FOR THE SELECTIVE HYDROGENATION OF POLYUNSATURATED HYDROCARBONS AND PROCESS FOR PREPARING THE CATALYST

BACKGROUND OF INVENTION

The field of art to which this invention pertains is catalysts for the selective hydrogenation of polyunsaturated hydrocarbons.

Catalysts made with palladium and a promoter on a metal oxide support have been used for the selective hydrogenation of butadiene, pentadiene and cyclopentadiene as described, for example, in West German Patent Applications, DE-A-3,207,029, DE-A-3,207,030 and DE-A-3,143,647, and in European Patent Application EP-A 11,906. In these cases, the hydrogenation reactions were carried out predominantly with catalysts made from palladium supported on $Al_2O_3$ or $SiO_2$ in particular. The conduct of the reaction is dealt with in detail in a paper by H. Laufer in "Erdol and Kohle" ("Petroleum and Coal"), volume 36, 249 (1983). A paper by M. L. Derrieu in "Catalytic Hydrogenation", Elsevier, Amsterdam, 1986, page 613, also describes established commercial processes and the catalyst used therein. The selectivity of these known catalysts is, however, still unsatisfactory.

A marked improvement of the selectivity in the case of diene or acetylene hydrogenation (increased olefin yield) was achieved by a partial poisoning (promotion of Pd catalysts with Zn, Cd, Sn, Pb and Hg; see G. C. Bond, "Catalysis by Metals", Academic Press, London, 1962, pages 99 and 297). The use of $CaCO_3$ as support and promotion of the palladium with Zn also led to an increase in selectivity in the case of the cyclopentadiene hydrogenation (U.S. Pat. Nos. 3,947,510 and 3,857,894). The use of other supports, such as MgO or $BaSO_4$, is likewise known in the case of Pd catalysts (R. J. Peterson, "Hydrogenation Catalysts", Noyes Data Corp., New York, 1977, page 183).

The selective hydrogenation of dienes containing more than five carbon atoms, for example from $C_6$ to $C_{10}$ dienes, in particular with isolated double bonds, however, becomes particularly difficult. During hydrogenation, they usually behave as monoolefins, i.e. they are immediately perhydrogenated to form the corresponding alkanes. If it is desired to achieve a selective hydrogenation which stops at the monoolefin stage, the reaction should be preceded, according to the opinion of the art, by a double bond isomerization to form a conjugated diene. Said isomerization is affected, as a rule, by the surface properties of the support material, for instance its acidity.

For hydrogenating longer-chain dienes, the literature frequently describes nickel catalysts which are partially poisoned with sulfur to increase the selectivity. The hydrogenation, described in U.S. Pat. No. 3,472,763, of a pyrolysis gasoline containing a proportion of diolefins of 6.8% by volume may serve as an example. Disadvantages of said catalyst are high hydrogenation pressure and low velocities, for example about 40 bar and 2 liters of hydrocarbon (liquid) per litre of catalyst and hour.

More suitable are the catalysts for the selective hydrogenation of polyunsaturated organic compounds known from West German Patent Application DE-A-3,320,388. Said catalysts are characterized by (A) a metal component composed of one or more elements of group VIII of the periodic system, in particular palladium, (B) a support material based on ($b_1$) one or more n-type semiconducting oxides of one or more elements from subgroups IVb (in particular $TiO_2$), Vb and VIb of the Periodic Table or of thorium or cerium, or based on ($b_2$) one or more n-type semiconducting mixed oxides of the formula $Me_2Me_1(O)_x$, wherein $Me_1$ denotes an element from the group defined in ($b_1$), $Me_2$ denotes an alkaline-earth metal or an element, different from $Me_1$, from the group defined in ($b_1$) and x is the number of oxygen atoms required to saturate $Me_1$ and $Me_2$ so as to reach the range of an n-type semiconducting state;

the hydrogen chemisorption power, expressed as the atomic ratio between chemisorbed hydrogen atoms and metal atoms of the metal component (A) ($H/Me_A$) at the surface of the metal particles, being at least 0.6:1.

The exemplary embodiments of DE-A-3,320,388 describe the hydrogenation of $C_6$ and $C_{10}$ dienes in a 1:10 mixture with the corresponding monoolefins.

As the molecular weight of the dienes increases and the concentration in the hydrocarbon fractions decreases, the selective hydrogenation is, however, made markedly more difficult. Such hydrocarbons originate, for example, from thermal or catalytic cracking processes and catalytic dehydrogenations. During the catalytic dehydrogenation of hydrocarbons containing more than five up to about thirty carbon atoms, for instance from $C_{10}$ to $C_{15}$ paraffins, in order to produce higher mono-olefins, a product mixture is produced for example, composed of non-reacted paraffins with about 10% mono-olefins and about 1% diolefins. The proportion of diolefins has to be reduced in view of the undesired side reactions during the further processing. A selective hydrogenation of the diolefins with an increase in monoolefins imposes particularly high requirements on the catalyst in such product flows.

Apart from high selectivity, the interposing of a hydrogenation stage is only economically acceptable if the hydrogenation catalyst makes possible short residence times, a lower hydrogenation pressure and the use of moderate temperatures.

The invention is consequently based on the object of improving the catalysts described in DE-A-3,320,388 in relation to their range of application (low hydrogenation pressures and temperatures) and also in relation to their selectivity.

SUMMARY OF THE INVENTION

The object of this invention is consequently a catalyst for the selective hydrogenation of polyunsaturated hydrocarbons having entirely or predominantly more than five carbon atoms, which contains palladium with a promoter on a metal oxide support and wherein the promoter is a metal from the subgroup IB of the Periodic Table and wherein the metal oxide support is macroporous $TiO_2$,* optionally mixed with macroporous $CeO_2$ and/or $ZrO_2$, the pore volume of the macroporous support being about 0.2 to 0.4, preferably about 0.25 to 0.3 ml per g of support and the proportion of the macropores having a diameter of more than 14 nm being at least 65%.

* Maximum in the pore size distribution curve at about 20 nm.

The catalyst according to the invention has a pore structure which is optimum for achieving a high selectivity. This pore structure is very important since, in the selective hydrogenation of long-chain hydrocarbons, reaction with hydrogen by mass transport (diffusion) in the pores of the catalyst should be impeded as little as possible.

DESCRIPTION OF THE INVENTION

The long-chain, polyunsaturated hydrocarbons used according to this invention contain from 5 to about 20 carbon atoms, with the preferred amounts being 5 to 15. The most preferred hydrocarbons are those having 9 to 15 carbon atoms. The unsaturated groups in the long-chain polyunsaturated hydrocarbons used in this invention can be conjugated or non-conjugated. Long-chain non-conjugated polyunsaturated hydrocarbons are much more difficult to selectively hydrogenate to olefins than conjugated hydrocarbons. However, using the catalysts of this invention, non-conjugated as well as conjugated hydrocarbons can be selectively hydrogenated to olefins.

The long-chain polyunsaturated hydrocarbons useful in this invention can contain two to four unsaturated groups per molecule, i.e., they can be dienes, trienes, or tetraenes. The preferred hydrocarbons contain two unsaturated groups.

European Patent EP-B-0,064,301 discloses a catalyst for the selective hydrogenation of acetylene which contains alpha aluminum oxide particles containing palladium and silver, the palladium content being from 0.01 to 0.025% by weight of the catalyst, the proportion of silver in percent by weight being at least twice as high as the proportion of palladium, the silver being distributed over all the catalyst particles and the entire palladium being concentrated in at least 90% of the catalyst particles, substantially in a region within 300 μm from the outer surface. The alpha aluminum oxide has preferably a specific surface in the range from 3 to 7 $m^2/g$, a pore volume of 0.24 to 0.34 ml/g and a mean pore radius in the range from 68.5 to 227 nm, i.e. it can be described as macroporous alpha aluminum oxide.

The catalyst known from EP-B-O, 064,301 is, however, not used for the selective hydrogenation of polyunsaturated higher hydrocarbons. If these hydrocarbons contain isolated double bonds, they behave essentially as monounsaturated hydrocarbons and in this respect are not comparable with acetylene which, according to EP-B-O, 0,064,301, should be selectively hydrogenated to ethylene, i.e. a monoolefin.

The macroporous alpha aluminum oxide support according to EP-B-O-,064,301 is an inert support which does not affect the course of the reaction. In the selective hydrogenation of acetylene, polymers (green oil) form which settle on the surface of the catalyst, for which reason a macroporous structure was proposed for the support.

On the other hand, the long-chain, polyunsaturated higher hydrocarbons used according to the invention virtually do not polymerize on the catalyst, in particular if they contain isolated double bonds.

The macroporous structure of the catalyst according to the invention is therefore of importance in the present case because the long-chain, polyunsaturated hydrocarbon molecules diffuse to the catalyst surface and the selectively hydrogenated hydrocarbon molecules have to diffuse away unimpeded from the catalyst surface.

Furthermore, in contrast to the inert alpha aluminum oxide, the macroporous titanium dioxide forms an active component of the catalyst according to the invention.

An important constituent, which favorably affects the activity of the catalyst according to the invention at low temperatures and pressures is the promoter, which is a metal from the subgroup 1B of the periodic system, in particular copper, silver, or gold. The preferred promoter metal is silver.

In general, the diameter of the macropores in the metal oxide support is about 14 to 80 nm, although larger diameters also occur. Within the region mentioned, the proportion of macropores is preferably 65 to 95, in particular 80 to 85%.

The macroporous metal oxide support may also be deposited as an intermediate layer on an inert support, for instance aluminum oxide or cordierite.

Preferably, the macroporous metal oxide support or the metal oxide support constituent (intermediate layer) has a BET surface of at least 20 $m^2/g$, in particular of at least 25 $m^2/g$, the upper limit lying, in general, at about 250 $m^2/g$, in particular at about 150 $m^2/g$.

The palladium content of the catalyst is preferably 0.01 to 2% by weight, in particular 0.05 to 0.5% by weight, the palladium being predominantly situated at the surface of the support. In this case, it is possible to speak of a "shell-like" noble metal distribution. In this manner, the active palladium surface is utilized in an optimum manner for the diene hydrogenation of long-chain molecules.

In this manner a smaller quantity of palladium is also sufficient.

The weight ratio between palladium and promoter metal may vary within wide limits, but preferably this ratio is 0.05 to 200, in particular 0.1 to 50.

The macroporous metal oxide support can preferably be obtained by subjecting a mixture of pulverulent support material and a substance which can be thermally decomposed to form gas optionally after molding or after application to the inert support as an intermediate layer, to a thermal treatment. For example, an organic substance may be added which decomposes and/or evaporates at the calcination temperature of the support and thereby produces the desired macroporous structure. Naturally, inorganic or organometallic substances which decompose to form gas can also be used.

The substances which decompose thermally to form gas are used, in general, in a quantity of 5 to 25% by weight relative to the macroporous metal oxide support obtained after the thermal treatment or to the proportion of the macroporous metal oxide support.

Examples of substances which decompose or evaporate at the calcination temperature of the support include monohydric and polyhydric alcohols, such as isopropanol, butanol, hexanol, ethylene glycol, propylene glycol, polyoxyalkylene glycols, glycerol, hexose, sucrose, starch, flour, and the like.

The metal oxide and the thermally decomposable compounds are calcined at temperatures of about 450° to about 650° C., preferably at about 500° to about 600° C., most preferably at 520° to 580° C. The calcining times will vary from about 2 hours to about 30 hours, preferably about 3 to about 16 hours.

The catalysts according to the invention can be obtained in the usual manner by impregnating or spraying the metal oxide support with a palladium salt solution.

Any of the palladium salts which have some degree of solubility in water can be used in this invention. Examples of such salts are palladium chloride, palladium nitrate, palladium acetate, palladium amine chloride, palladium amine carbonate, and the like. The process of spraying or impregnating the support with a salt solution is described as the "pore filling method". In this case, the palladium is distributed over the entire specific surface of the metal oxide support. As a result of the "chromatographic effects" occurring during the drying of the impregnated support however, the surface of the carrier is irregularly covered with palladium, and very wide palladium depth profiles are produced. Since both effects could act on the activity and selectivity of the catalyst in an adverse manner, the procedure is preferably such that the macroporous metal oxide support is preimpregnated with a solution of a reducing agent for the palladium compound (preferably a palladium salt) and is dried. The treated metal oxide support is then impregnated with the solution of the palladium compound, dried and calcined to reduce the palladium compound. In this case, the palladium is "fixed" at the surface by immediate reduction and consequently, the desired "shell-like" distribution is achieved. This distribution can be demonstrated by scanning electron microscope examinations in conjunction with an energy-dispersive X-ray analysis (SEM/EDX examination). The metal oxide support loaded with palladium is then impregnated with a solution of a promoter compound (for example, a silver salt, such as silver nitrate), dried and calcined.

Suitable reducing agents for reducing the palladium compound include such compounds as the alkali metal formates, hydrazine, hydrazine compounds, such as the carbonate, sulfate or hydrate, hydroxylamine and the like.

After the treatment of the metal oxide support with the palladium salt solution, drying is conducted at a temperature of about 100° to about 120° C. for about 3 to about 20 hours. The temperature is then increased at a rate of about 20° to about 100° C. per hour to about 350° to about 400° C., preferably about 380° to about 420° C. The temperature is maintained at the calcining temperature for about 1 to about 10 hours.

Treatment of the catalyst with the promoter compound is conducted in substantially the same manner as the palladium salt impregnation. Drying is carried out at the same temperature range for the same time as those used in palladium drying, i.e., at about 100° to about 120° C. for about 3 to about 20 hours. The temperature is then increased at a rate of about 20° to about 100° C. per hour to about 300° to about 400° C., preferably 320° to 380° C. The temperature is maintained at the calcining temperature for about 1 to about 10 hours.

As already mentioned, the formation of conjugated dienes by displacing the double bond from isolated dienes is a requirement for the selective hydrogenation of dienes to olefins. It has been found that the pronounced ability of the catalyst according to the invention, on the one hand, to shift double bonds and also, on the other hand, to selectively hydrogenate the conjugated dienes results from the interaction of the three components Pd, promoter metal (in particular Ag) and macroporous carrier containing $TiO_2$.

The subject of the invention is also the use of the above described catalyst for the selective catalytic hydrogenation of polyunsaturated hydrocarbons which contain entirely or predominantly more than five carbon atoms, to the corresponding monoolefins. Preferably, the selective hydrogenation is preceded by a preliminary separation or fractionation of the lower ($C_2$-$C_4$) polyunsaturated hydrocarbons, i.e., acetylene, propadiene, 1,2- and 1,3-butadiene, ethyl acetylene, and vinyl acetylene.

The supply of the hydrogenation hydrogen to the hydrogenation reactor is preferably carried out separately from the supply of the polyunsaturated hydrocarbons. In general, the catalyst is exposed to the feedstock hydrocarbon and the hydrogenating hydrogen in a continuous reactor, typically in cocurrent from the top downwards ("trickle phase"). In some cracking and dehydrogenating processes, said hydrogenation reactor may be incorporated directly in the product stream before the separation of the gaseous and liquid products. For controlled metering of the hydrogen, it is, however, frequently expedient to provide a preliminary separation and then a separate hydrogen feed. If gas components which are reversible or irreversible catalyst poisons are present, a preliminary separation, and possibly also a preliminary fractionation, is also useful.

The hydrogenation may be carried out at pressures and temperatures which are provided, for example in the case of catalytic $C_{10}$ to $C_{13}$ paraffin hydrogenations after the feed-stock/product heat exchanger.

Preferably, the selective hydrogenation is carried out in a temperature range of 80° to 180° C., in particular of 100°-160° C., a pressure range of 1-10, in particular of 1-3 bar, at a space velocity (LHSV=liquid hourly space velocity) of 1 to 30 liters of the liquid hydrocarbon fraction per litre of catalyst and hour and a molar ratio of hydrogen to polyunsaturated hydrocarbons of 1.1 to 5, in particular of 2 to 3.5. The most favorable conditions in each case naturally depend on the nature of the hydrocarbon mixture, its content of polyunsaturated hydrocarbons, the desired selectivity, but also on the configuration of the reactor.

Example 1 below describes, in a non-restrictive manner, the preparation of catalyst according to the invention. This catalyst was subsequently used in accordance with Example 2 for a $C_{10}$ to $C_{13}$ diene hydrogenation in a continuous reactor.

EXAMPLE 1

Preparation of the Catalyst

A commercial titanium dioxide is homogenized in an intensive mixture with about 15% by weight of glycerol being added to form a paste. After drying for several hours at 100° C., the $TiO_2$ mass is comminuted, mixed with aluminum stearate as a tableting agent and pressed into cylindrical tablets (diameter=height=4.5 mm), the lateral crush strength of which is 50-85 N/4.5 mm. The $TiO_2$ tablets are calcined for several hours at 550° C. in an oxidizing atmosphere, in which process the glycerol decomposes or burns out. After calcination, the support has a mean lateral crush strength of 150 N/4.5 mm. The pore volume determined by means of mercury porosimetry is 0.27 ml/g, with a very narrow (monomodal) pore distribution having a maximum at 20 nm.

The $TiO_2$ support is spray-impregnated with a 5% aqueous sodium formate solution (13 ml of formate solution per 100 g of support). The support pretreated in this manner is then spray-impregnated with the same volume of a 2.5% aqueous $PdCl_2$ solution. To completely reduce the noble metal, the support tablets are coated with formate solution, filtered by suction and washed. After drying at 110° C., calcination is carried out up to a final temperature of 400° C.

The silver promotion is then carried out. The palladium-containing TiO$_2$ tablets are impregnated with silver nitrate solution at room temperature, dried at 110° C. and once again calcined up to a temperature of 360° C.

The catalyst has the following physical data:

| | | |
|---|---|---|
| Lateral crush strength | (N/4.5 mm) | 7.4 |
| Bulk density | (g/liter) | 1110 |
| BET surface | (m$^2$/g) | 43 |
| Pore volume | (ml/g) | 0.29 |
| Pore distribution: | | |
| 7.5–14 nm | | 3.7 |
| 14–80 nm | | 83.9 |
| 80–1750 nm | | 7.5 |
| >1750 nm | | 4.9 |

The palladium content is 0.18% by weight and the silver content 0.13% by weight. The catalyst has a shell-like palladium distribution.

EXAMPLE 2

Selective Hydrogenation

A diene-containing hydrocarbon fraction (C$_{10}$ to C$_{13}$) having the following composition (percent by weight) is selectively hydrogenated:

| | |
|---|---|
| Diolefins (dienes) | 1.0 |
| Olefins | 10.0 |
| Aromatics | 3.0 |
| Paraffins | 86.0 |

The hydrogenation was carried out in a continuous reactor using the Pd/Ag catalyst tables from Example 1 (4.5 × 4.5 mm) under the following reaction conditions:

| | |
|---|---|
| T | 120° C. |
| P (total) | 1.5 bar |
| P$_{H2}$ | 0.3 bar |
| H$_2$/diene molar ratio | 3 |
| LHSV | 10 (hydrocarbon fraction)/hour and liter of catalyst |

The hydrogenation product contained 0.3% by weight of diolefins, and the aromatics content remained unaltered. The proportion of olefins increased to 10.4% by weight and the paraffin content increased slightly to 86.3%.

The principles, preferred embodiments and modes of operation of the present invention have been described in the foregoing specification. The invention which is intended to be protected herein, however, is not to be construed as limited to the particular forms disclosed since these are to be regarded as illustrative rather than restrictive. Variations and changes may be made by those skilled in the art without departing from the spirit of the invention.

What is claimed is:

1. A catalyst for the selective hydrogenation of polyunsaturated hydrocarbons having at least 5 carbon atoms comprised of salladium with a promoter on a metal oxide support, wherein the promoter is a metal from the subgroup 1B of the periodic table and wherein the metal oxide support is macroporous TiO$_2$, the pore volume of the support being about 0.2 to about 0.4 ml per g of support and the proportion of the macropores having a diameter of more than 14nm being at least 65%.

2. The catalyst of claim 1 wherein the macroporous TiO$_2$ is mixed with macroporous CeO$_2$, ZrO$_2$, or mixture thereof.

3. The catalyst of claim 1 wherein the pore volume of the support is about 0.25 to about 0.3 ml per g of support.

4. The catalyst of claim 1 wherein the promoter is silver.

5. The catalyst of claim 1 wherein the proportion of the macropores in the metal oxide support having a diameter of 14 to 80 mm is 65 to about 95%.

6. The catalyst of claim 5 wherein the proportion of the macropores is about 80 to about 85%.

7. The catalyst of claim 1 wherein the macroporous metal oxide support has a BET surface of at least 20 m$^2$/g.

8. The catalyst of claim 7 wherein the BET surface is at least 25 m$^2$/g.

9. The catalyst of claim 1 wherein the macroporous metal oxide support is deposited as an intermediate layer on an inert support.

10. The catalyst of claim 9 wherein the macroporous metal oxide support has a BET surface of at least 20 m$^2$/g.

11. The catalyst of claim 10 wherein the BET surface is at least 25 m$^2$/g.

12. The catalyst of claim 1 wherein the palladium content is about 0.01 to about 2% by weight based on the total weight of the catalyst and wherein the palladium is predominantly situated at the surface of the support.

13. The catalyst of claim 12 wherein the palladium content is about 0.05 to about 0.5% by weight.

14. The catalyst of claim 1 wherein the weight ratio between palladium and promoter metal is 0.05 to about 200.

15. The catalyst of claim 14 wherein the weight ratio is about 0.1 to about 50.

16. The catalyst of claim 1 wherein the macroporous metal oxide support is obtained by subjecting a mixture of pulverulent support material and a substance which can be thermally decomposed to form gas to a thermal treatment.

17. The catalyst of claim 16 wherein the mixture of pulverulent support material and the substance which can be thermally decomposed to form gas is molded before the thermal treatment.

18. The catalyst of claim 16 wherein the mixture of pulverulent support material and the substance which can be thermally decomposed to form gas is applied to an inert support before the thermal treatment.

19. The catalyst of claim 16 wherein the substance which can be thermally decomposed to form gas is present in the amount of about 5 to about 25 weight percent based on the weight of macroporous metal oxide support obtained after the thermal treatment.

20. The catalyst of claim 18 wherein the substance which can be thermally decomposed to form gas is present in the amount of about 5 to about 25 weight percent based on the weight of the macroporous metal oxide on the inert support.

21. A process for obtaining the catalyst of claim 1 which comprises preimpregnating the macroporous metal oxide support with a solution of a reducing agent for the palladium compound, drying, impregnating with a solution of the palladium compound, drying, calcining to reduce the palladium compound, impregnating with a solution of a promoter compound, drying and calcining.

22. The process of claim 21 wherein the reducing agent is an alkali metal formate and the palladium compound is a palladium salt.

* * * * *